United States Patent [19]

McLeish et al.

[11] Patent Number: 5,795,359
[45] Date of Patent: Aug. 18, 1998

[54] APPARATUS FOR SEPARATING PARTICULATE AND/OR POWDERY MATERIAL FROM AN ENTRAINING GAS

[75] Inventors: Andrew McLeish; Roy Cartilage; Michael Coffey; Michael Prior, all of Cheshire, United Kingdom

[73] Assignee: Hosokawa Micron Limited, Cheshire, United Kingdom

[21] Appl. No.: 710,884

[22] Filed: Sep. 23, 1996

Related U.S. Application Data

[63] Continuation of Ser. No. 341,874, Nov. 15, 1994, abandoned.

[51] Int. Cl.$^6$ .................................................. B01D 46/04
[52] U.S. Cl. ........................... 55/242; 55/302; 55/523; 95/280; 95/281
[58] Field of Search ............................ 55/242, 302, 523; 95/280, 281

[56] References Cited

U.S. PATENT DOCUMENTS

| | | | |
|---|---|---|---|
| 2,804,168 | 8/1957 | Church | 55/523 |
| 3,623,910 | 11/1971 | Calhoun et al. | 95/281 |
| 4,080,431 | 3/1978 | Moss | 55/523 |
| 4,277,260 | 7/1981 | Browning | 55/302 |
| 4,278,454 | 7/1981 | Nemesi | 55/302 |
| 4,298,360 | 11/1981 | Poll | 55/302 |
| 4,436,536 | 3/1984 | Robinson | 55/302 |
| 4,468,240 | 8/1984 | Margraf | 55/302 |
| 4,637,473 | 1/1987 | Gillis et al. | 55/302 |
| 4,666,472 | 5/1987 | Klimczak et al. | 55/302 |
| 4,731,100 | 3/1988 | Loeffelmann et al. | 95/281 |
| 4,738,696 | 4/1988 | Staffeld | 55/302 |
| 4,741,803 | 5/1988 | Loeffelmann | 95/279 |
| 4,865,627 | 9/1989 | Dewitz et al. | 55/302 |
| 5,062,867 | 11/1991 | Klimczak | 55/302 |
| 5,288,299 | 2/1994 | Yoshida et al. | 55/302 |
| 5,358,552 | 10/1994 | Seibert et al. | 55/242 |
| 5,401,406 | 3/1995 | Johnson et al. | 55/523 |

FOREIGN PATENT DOCUMENTS

| | | | |
|---|---|---|---|
| 3325807 | 12/1981 | Germany | 55/242 |
| 3022203 | 1/1985 | Germany | 55/242 |
| 791510 | 3/1958 | United Kingdom | 55/242 |

*Primary Examiner*—C. Scott Bushey
*Attorney, Agent, or Firm*—Dennison, Meserole, Pollack & Scheiner

[57] ABSTRACT

An apparatus for separating particulate or powdery material from an entraining gas includes a housing defining a closed chamber having an inlet for the material and gas, an outlet in the lower region of the housing for separated material, an outlet for filtered gas and a tubular filter disposed between the inlet and gas outlet and mounted such that the gas must pass through the filter to reach the gas outlet. A first washing device is provided for introducing a washing liquid into the chamber and washing the interior of the housing and the filter, and a second washing device is disposed in an upper region of the filter and includes nozzles connected to the end of a liquid supply pipe which extends coaxially or concentrically within a back flow gas supply pipe.

21 Claims, 2 Drawing Sheets

APPARATUS FOR SEPARATING PARTICULATE AND/OR POWDERY MATERIAL FROM AN ENTRAINING GAS

This is a continuation of application Ser. No. 08/341,874 filed on Nov. 15, 1994 now abandoned

BACKGROUND OF THE INVENTION

The present invention concerns improvements in or relating to apparatus for separating particulate and/or powdery material from an entraining gas. The present invention preferably concerns improvements in or relating to apparatus for filtering a powder from an air-flow or to vent a separate vessel. More particularly, the present invention relates to a reverse jet product collection filter apparatus.

The present invention is particularly concerned with filter apparatus for filtering a powder from an air-flow containing such powder, in order to pack or bag such powder. Normally, the powder will have been subjected to one or more operations, e.g. milling, drying, conveying, and the resultant powder is entrapped in an air-flow. Such combined air and powder is then passed into a filter apparatus wherein the powder and air are separated from one another.

At the present time, an apparatus is utilised for filtering a finely dispersed powder from an air-flow, which apparatus comprises a housing having an inlet for air and powder, means for collecting powder separated from said air and means for permitting "clean" air to pass out of the apparatus. The housing is normally split into a region containing the air and powder and a region containing only clean air by means of a partition or separation member. Such clean air is obtained by filtering the powder from the air through one or more sintered metal fibre filter elements which are suspended downwardly from said partition or separation member. The powder remains on one side of the filter elements and the clean gas flows through into the non-powder side of the housing and then out of the housing. The filter elements are intermittently cleaned by a reverse jet of air which is normally pulsed down each filter element to give a reverse flow for a fraction of a second. Such reverse flow pulsing takes place, on average, about every fifteen seconds or as required. The reverse flow of air may be accelerated down each filter element by passing the air through a venturi. The venturi is normally located in the region of the partition or separation member and each filter element is attached to the underside of said member by suitable clamping means, the upper end of each filter element, normally in the form of a tube, being located over the outlet end of said venturi and thereafter being clamped to the underside of the partition or separation member.

Once a particular batch or series of batches of a product have been treated in the filter apparatus, and before the filter apparatus can be utilised for another material in powder form, then in order to prevent contamination of powders from one batch to another, it is necessary to open existing apparatus to either manually clean same or to add extra cleaning devices. Certain existing filter apparatus include spray devices therein for cleaning but such cleaning devices are not able to thoroughly clean the filter apparatus to the required degree. In particular, it is not possible to remove all material from crevices which occur between the venturi and the separation member and the separation member itself is difficult to clean and does not readily self drain.

SUMMARY OF THE INVENTION

It is an object to the present invention to provide an apparatus which at least minimises the disadvantages referred to above and provides a filter apparatus which can be cleaned in situ.

According to the present invention there is provided an apparatus for separating powdery material from an entraining gas comprising a housing having an inlet for gas and powder, an outlet in a lower region for powder and an outlet in an upper region for filtered gas; filter means between the inlet and gas outlet; and means for introduction of a washing liquid upstream and downstream of said filter means to enable the interior of the housing and the filter means to be washed without dismantling the apparatus.

Also in accordance with the present invention there is provided an apparatus for separating particulate and/or powdery material from an entraining gas including means for in situ washing, comprising a housing defining a closed chamber having an inlet for powder and gas, an outlet in a lower region of the housing for particulate and/or powdery material, an outlet for filtered gas and filter means disposed between the inlet and gas outlet and mounted such that the gas must pass through said filter means to reach the gas outlet; wherein washing means, suitably in the form of a plurality of washing nozzles, for introducing washing liquid are provided in said chamber and disposed to wash the interior of the housing and said filter means, and, preferably, further washing means for introducing washing liquid downstream of the filter means and/or in a chamber downstream of the filter means and before the gas outlet.

Preferably, a plurality of filter means are arranged around a central washing nozzle in a circular or other disposition, for example arranged equidistantly around said central washing nozzle.

In a preferred embodiment of the present invention a plurality of filter means are suspended in said chamber from an upper partition wall which extends across said housing to define an upper chamber portion leading to said gas outlet. In such situation, a washing means is also disposed in said upper chamber.

The filter means are preferably tubular and a washing means is disposed in an upper region thereof. In such arrangement, the washing means preferably comprises nozzles connected to an end of a liquid supply pipe which extends coaxially or concentrically, within a back flow gas supply pipe. In a further preferred embodiment, such gas supply pipe is located vertically within the chamber.

The cleaning means each preferably comprise a ball nozzle arrangement to enable spray cleaning to be effected, and said partition wall is preferably self-draining.

In a further embodiment of the present invention, a venturi is provided to accelerate flow of air down through each filter means. The venturi is located flush with the upper surface of the partition wall so as to ensure that cleaning of the upper surface of the partition wall may be effected and the cleaning liquid being allowed to drain through the filter means. In order to provide crevice-free mounting of the venturi, the base of the venturi is preferably formed integrally with or connected to, its associated filter means.

In accordance with one aspect of the present invention there is provided a filter apparatus, suitable for filtering a finely dispersed powder from an air flow containing such powder, said apparatus comprising a container having an inlet in its normally lower region to permit an air flow containing dispersed powder to pass into the container, a powder collection region in the base of the container, an outlet in the normally upper region of the container through which "clean" air may flow out of the container, a plate member separating the container into a region in which the mixed air and powder is allowed to circulate and a region in which the clean air is allowed to circulate, a plurality of filter members extending downwardly from the underside of said plate member, means for enabling a reverse flow of a jet of air to be passed down through said filter members and a venturi being provided to accelerate flow of such air down through the filter members, in which the apparatus contains means for in-situ cleaning of the interior of said container, the interior and exterior of said filter members and said topside and underside of said plate member.

Said in-situ cleaning of the apparatus can be effected by modifying the construction of various integers of the filter apparatus and/or by provision of appropriate cleaning and/or spraying apparatus.

According to another aspect of the invention, each filter member, which are preferably tubular in shape, is connected to the base of its associated venturi, such as by welding to the base of the venturi or forming the venturi as an integral part of the filter element. Furthermore, each said venturi is provided with an appropriate seal arrangement, such as an "O" ring, to enable a crevice free connection of the filter member to the partition wall or separation member.

The separation member is provided with a number of apertures corresponding to the number of filter members to be attached to such separation plate member.

In a further aspect of the invention, the pipe which is utilised to pass air through the filter members, when reverse flow of air is utilised, also contains a water cleaning pipe for cleaning the inside of the filter elements.

In a still further aspect of the present invention, the filter elements and associated venturis are located completely beneath the separation member so as to allow for free drainage of the cleaning liquid into the apertures in the separation plate member.

In another aspect of the present invention, the separation plate member has a filter means incorporated therein which allows any trapped air in the powder side of the filter to vent into the non-powder side of the filter upon flood washing of the apparatus.

In a preferred embodiment, the filter elements, suitably formed of sintered metal fibre filter elements, are arranged in a circular array inside the container. The provision of such circular arrangement means that a single water spray device can be used to spray the inner portions of such filter elements.

It will thus be seen that the present invention provides a filter arrangement which overcomes disadvantages mentioned previously to enable in situ cleaning of the apparatus to be effected without having to manually clean the interior of the housing prior to utilisation of the device with a different powder or batch. The areas of application of the filter apparatus in accordance with the present invention would be in any industry where the containment of powders being processed and the prevention of cross-contamination of powders from batch to batch is of extreme importance. For example, the filter apparatus of the present invention would be particularly useful in the treatment of pharmaceuticals, fine chemicals, nuclear materials and pigments.

The advantages of the present invention are provided by the filter elements being connected, e.g welded, to the bottom of the venturi, or the venturi being formed integrally with its associated filter element. Moreover, the provision of the venturi with a suitable seal, e.g. double "O" ring arrangement, provides a crevice free seal on both the powder and the non-powder side of the separation member.

The water pipe for cleaning the interior of a filter element preferably runs vertically down inside the air-pipe utilised for reverse thrust. Such arrangement for cleaning the filter elements means that such elements will self-drain, provide an unimpeded air-flow for the reverse jet pulse and enter the filter element via one nozzle.

The venturis and associated filter elements are located completely beneath the separation plate member which allows free drainage of the cleaning liquid into the filter elements through the associated apertures provided in the separation plate member.

The provision of suitable filter media in an aperture provided in the separation plate member, e.g. by welding such filter material into such aperture, allows any trapped air to vent into the non-powder side of the filter so that the complete unit can be flooded with cleaning liquid, without any air pockets being present.

By utilising the filter apparatus in accordance with the present invention, it is possible for the filter apparatus to be cleaned in situ, there being no requirement to enter the apparatus for further cleaning after the washing cycle has been completed.

BRIEF DESCRIPTION OF THE DRAWINGS

The present invention will be illustrated, by way of example, with reference to

DESCRIPTION OF THE PREFERRED EMBODIMENTS

Figure 1:
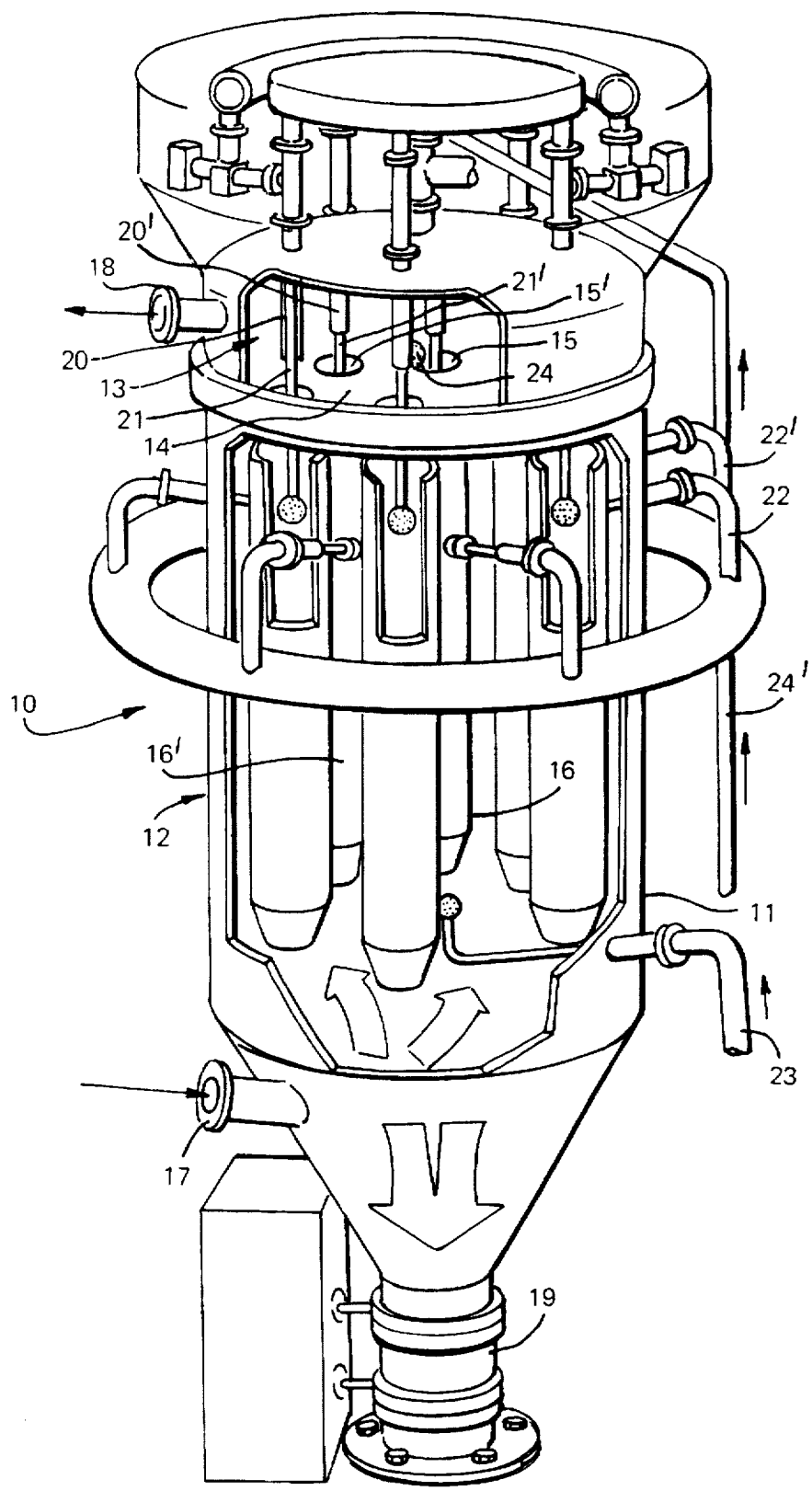
FIG. 1 of the accompanying drawings which is a perspective view, partially cut away, of a filter apparatus in accordance with the present invention, and to FIG. 2 which is a cross-sectional view of a portion of the apparatus shown in FIG. 1.
Figure 2:
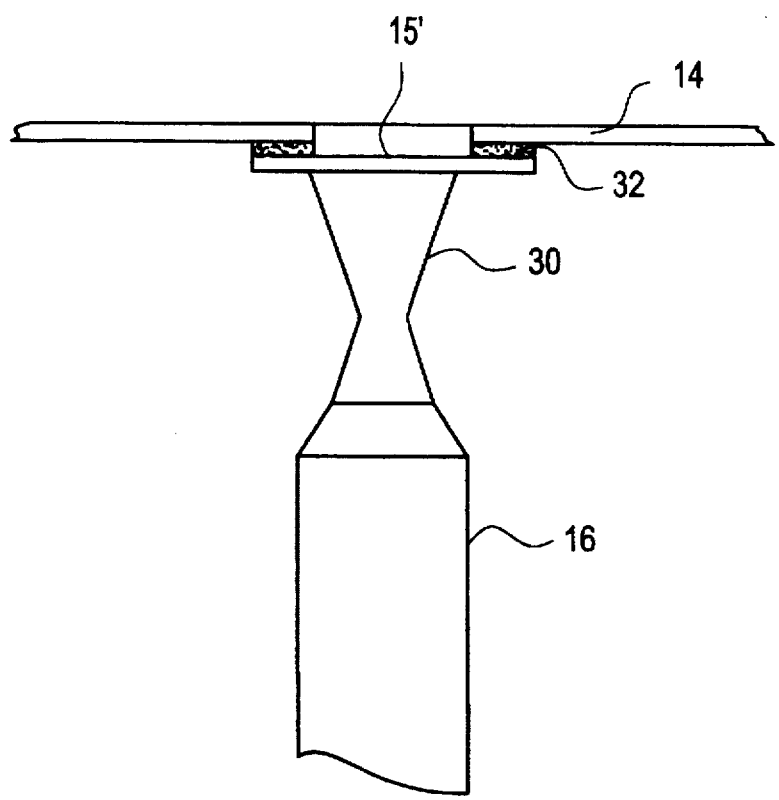

A reverse jet product collection filter 10 comprises a housing 11 which is separated into a powder side 12 and a non-powder side 13 by a partition wall or separation plate member 14. Such member 14 is provided with a plurality of apertures 15' corresponding in number to the number of tubular filter elements 16, 16'. . . . Each such filter element 16,16' . . . is integrally formed with a venturi 30 which is connected to the separation plate number 14 by appropriate "O" ring seal 32 and is located flush with the upper surface of member 14.

The housing 11 is provided with an inlet 17 for introduction of air and powder into the housing 11 and an exit 18 for removal of clean air from the housing 11.

The housing 11 is provided with a region 19 for collection of powder separated from the air, which powder is subsequently packed or bagged.

In operation, air and powder is introduced through inlet 17 into the housing 11 and the air is removed from the powder by passing through the sintered metal fibre filter elements 16,16' . . . . Clean air passes out through apertures 15,15' . . . and out of the housing 11 through exit or outlet 18. In order to provide a reversed pulse of air into the filter element 16,16' . . . , appropriate air pipes 20.20' . . . are utilised.

In order to enable in situ cleaning of the apparatus to be effected, various cleaning devices are incorporated in the filter apparatus. In this connection, water pipes 21, 21' run vertically down the inside of air pipe 20, 20' for cleaning the inside of the filter elements 16,16' . . . .

An array of spray cleaning devices 22, 22' . . . are provided in order to clean the interior of the housing 11 and also for cleaning the outer region of the filter elements 16, 16'. In order to clean the inner region of the filter elements 16,16' a cleaning device 23 is provided. The circular array of filter element 16, 16' means that only two cleaning devices 23 or 23' need be utilised. A further cleaning device 24 is provided in the region of the powder free region of the container and is supplied with water via a pipe 24'.

In operation, air and powder are introduced into the housing 11 via inlet 17. The finely dispersed powder is filtered from the air flow by utilising a plurality of sintered stainless steel fibre tubular filter elements 16. The powder remains on one side of the tubular filter elements 16,16' and the clean gas flows through into the non-powder side of the housing 11 and out of such housing 11 through outlet 18. Each filter element 16 is intermittently cleaned by a reverse jet of air which is pulsed down each element 16 to give a reverse flow for a fraction of a second. Such pulsing takes place approximately every 15 seconds or as required. The reverse flow of air is accelerated down each filter element 16 by passing it through a venturi.

After dry filtration of the powder is complete, the housing is wet cleaned and/or sterilised by using a series of spray balls strategically located inside the product and non-product side of the filter.

The cleaning pipes 21 for washing the inside of the filter elements 16,16' are arranged so that they pass centrally down the reverse cleaning pipes 13.

As a result of such procedure, coupled with the use of additional cleaning elements 22, the interior of the housing and the filter elements are washed in situ and accordingly there is no need to open up and enter the housing for further cleaning after the automatic washing cycle has been completed.

It will thus be seen that the apparatus of the present invention enables in situ cleaning of the filter housing. Accordingly it is possible to prevent contamination of powders from one batch to another without having to open the apparatus and either manually clean same or to add additional cleaning devices.

A further feature of the present invention enables the apparatus to be utilised for flood washing as well as spray washing. One of the main problems associated with flood washing is in relation to air pockets building up on the underside of the partition or separation member. In the present invention, an aperture is provided in the central region of the separation member 14 and a piece of filter media is welded into such aperture. Such arrangement allows any trapped air to vent into the non-powder side of the filter apparatus so that the complete unit can be flooded with cleaning liquid. Thus, the entire interior of the housing can be filled with cleaning liquid to ensure that all remnants of powder are removed so that contamination of powders from one batch to another is prevented.

It is believed that the advantages of the present invention are achieved by the filter elements being connected e.g. welded, to the bottom of the venturi. In addition, the provision of a venturi with a double "O" ring arrangement provides a crevice-free seal on the powder and the non-powder side of the separation member. Furthermore, the location of the water pipe vertically within the air pipe for cleaning the filter elements means that they will self drain, provide an unimpeded airflow for the reverse jet pulse and will enter the vessel via one nozzle. In addition, the venturis and filter elements are located completely beneath the filter plate which allows free drainage of the cleaning liquid into the apertures provided in the filter plate. Finally, as mentioned above, the provision of a filter media in the central region of the plate member allows any trapped air to vent into the non-powder side of the filter so that the complete unit can be flooded with the cleaning liquid.

The cleaning fluid utilised can be such as desired to clean and/or sterilise the interior of the container.

What is claimed is:

1. An apparatus for separating particulate or powdery material from an entraining gas including means for in-situ washing, comprising a housing defining a closed chamber having an inlet for the material and gas, an outlet in a lower region of the housing for separated material, an outlet for filtered gas and tubular filter means disposed between the inlet and gas outlet and mounted such that the gas must pass through said filter means to reach the gas outlet, wherein first washing means for introducing a washing liquid are provided in said chamber and disposed to wash an interior portion of the housing and said filter means, and second washing means are disposed in an upper region of said tubular filter means, said second washing means comprising nozzles connected to the end of a liquid supply pipe which extends coaxially or concentrically within a back flow gas supply pipe.

2. An apparatus as claimed in claim 1, wherein said first washing means is in the form of a plurality of washing nozzles.

3. An apparatus as claimed in claim 1 additionally including further washing means for introducing washing liquid downstream of the filter means or in a chamber downstream of the filter means and before the gas outlet.

4. Apparatus as claimed in claim 1, in which a plurality of said filter means are arranged around a central washing nozzle.

5. An apparatus as claimed in claim 1, in which a plurality of filter means are suspended in said chamber from an upper partition wall which extends across said housing to define an upper chamber portion leading to said gas outlet.

6. An apparatus as claimed in claim 5, in which a washing means is also disposed in said upper chamber portion.

7. An apparatus as claimed in claim 1, in which said gas supply pipe is located vertically within the chamber.

8. An apparatus as claimed in claim 1, wherein said second washing means each comprises a ball nozzle arrangement to enable spray cleaning to be effected.

9. An apparatus as claimed in claim 1, in which a venturi is provided to accelerate flow of air down through each filter means.

10. An apparatus as claimed in claim 9, in which each venturi is located flush with an upper surface of a partition wall.

11. An apparatus as claimed in claim 10, in which the venturi comprises a base which is formed integrally with or connected to an associated filter means.

12. A filter apparatus, suitable for filtering a finely dispersed powder from an air flow containing such powder, said apparatus comprising a container having an inlet in a normally lower region thereof to permit an air flow containing dispersed powder to pass into the container, a powder collection region in a base portion of the container, an outlet in a normally upper region of the container through which cleaned air may flow out of the container, a plate member separating the container into a region in which the air flow containing finely dispersed powder is allowed to circulate and a region in which the cleaned air is allowed to circulate, a plurality of filter members extending downwardly from an underside of said plate member, a pipe for enabling a reverse flow of a jet of air to be passed down through said filter members and a venturi being provided to accelerate flow of such air down through the filter members, said pipe also containing a water cleaning pipe for cleaning an inside portion of the filter members, in which the apparatus also contains means for in-situ cleaning of an interior portion of said container, an exterior portion of said filter members and a top side and the underside of said plate member.

13. An apparatus as claimed in claim 12, wherein each filter member is connected to a base portion of an associated venturi and each said venturi is provided with a seal arrangement to enable a crevice-free connection of the filter member to the plate member.

14. An apparatus as claimed in claim 13, in which the plate member is provided with a number of apertures each corresponding to a filter member to be attached to said plate member.

15. A filter apparatus as claimed in claim 14, in which the filter elements and associated venturis are located completely beneath the plate member so as to allow for free drainage of cleaning liquid into the apertures in the plate member.

16. A filter apparatus as claimed in claim 15, in which the plate member has a filter member incorporated therein.

17. A filter apparatus as claimed in claim 12, in which the filter members are formed of sintered metal fibre filter elements and are arranged in a circular array inside the container.

18. An apparatus is claimed in claim 13, wherein each filter member is tubular in shape.

19. An apparatus as claimed in claim 13, wherein said seal arrangement is an O-ring.

20. A filter apparatus, suitable for filtering a finely dispersed powder from an air flow containing such powder, said apparatus comprising a container having an inlet in a normally lower region thereof to permit an air flow containing dispersed powder to pass into the container, a powder collection region in a base portion of the container, an outlet in a normally upper region of the container through which cleaned air may flow out of the container, a plate member having upper and lower surfaces separating the container into a region in which the air flow containing finely dispersed powder is allowed to circulate and a region in which the cleaned air is allowed to circulate, a plurality of substantially tubular, sintered metal fiber filter members extending downwardly from an underside of said plate member, a pipe for enabling a reverse flow of a jet of air to be passed down through said filter members and a plurality of venturis, each having an upper portion flush mounted to the upper surface of said plate member and a lower portion weld mounted to each one of said plurality of filter members, constructed and arranged to accelerate flow of such air downwardly through the filter members, in which the apparatus also contains means for in-situ cleaning of an interior portion of said container, an interior and an exterior portion of said filter members and a top side and the underside of said plate member.

21. An apparatus for separating particulate or powdery material from an entraining gas including means for in-situ washing, comprising a housing defining a closed chamber having upper and lower regions separated by a plate, an inlet for the material and gas, an outlet in the lower region of the housing for separated material, an outlet for filtered gas in the upper region of the housing, a substantially tubular, sintered metal fiber filter element disposed between the inlet and gas outlet and a venturi having a bottom portion weld mounted to said filter element so as to accelerate a reverse cleaning air flow downwardly through said filter element, the venturi having a top portion flush mounted to an upper surface of the plate, the filter element and the venturi being arranged such that gas must pass sequentially upwardly through the filter element and the venturi to reach the gas outlet, wherein a first washing means for introducing a washing liquid is provided in said chamber and disposed to wash an interior portion of the housing and said filter means.

* * * * *